US009470249B2

(12) United States Patent
Xu et al.

(10) Patent No.: US 9,470,249 B2
(45) Date of Patent: Oct. 18, 2016

(54) CYLINDER

(71) Applicants: Huan-Fan Xu, Shenzhen (CN); Jun He, Shenzhen (CN)

(72) Inventors: Huan-Fan Xu, Shenzhen (CN); Jun He, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 513 days.

(21) Appl. No.: 13/726,542

(22) Filed: Dec. 25, 2012

(65) Prior Publication Data

US 2013/0213215 A1 Aug. 22, 2013

(30) Foreign Application Priority Data

Feb. 17, 2012 (CN) .......................... 2012 1 0035951

(51) Int. Cl.
*B23Q 3/10* (2006.01)
*F15B 15/14* (2006.01)

(52) U.S. Cl.
CPC ....... *F15B 15/1457* (2013.01); *F15B 15/1466* (2013.01)

(58) Field of Classification Search
CPC ............ F15B 15/1457; F15B 15/1466; F15B 15/261
USPC ........ 269/24, 17, 309; 92/14, 15, 20, 22, 23, 92/29, 107
See application file for complete search history.

(56) References Cited

U.S. PATENT DOCUMENTS 5,064,530 A * 11/1991 Duff .......................... B03C 1/28 210/167.03
6,024,354 A * 2/2000 Yonezawa ..................... 269/309
7,914,225 B2 * 3/2011 Hageman .................. 403/322.2

* cited by examiner

*Primary Examiner* — Thomas Lazo
*Assistant Examiner* — Dustin T Nguyen
(74) *Attorney, Agent, or Firm* — Zhigang Ma

(57) ABSTRACT

A cylinder includes a cylinder body assembly, a cylinder rod assembly, and a piston assembly. The cylinder body assembly includes a cylinder body. The cylinder body defines a receiving chamber. The cylinder rod assembly includes a rod fixed with the cylinder body. The rod includes an inclined resisting surface. The piston assembly includes a piston, a piston rod, and one or more resisting member. The piston is slidably received in the receiving chamber and sleeved on the rod. The piston rod protrudes from the piston and extending out from the receiving chamber. The piston rod is sleeved on the rod, and defines a through hole. The resisting member is movably mounted in the through hole. The piston and the piston rod slide relative to the rod, which enable the resisting surface to resist the resisting member to be partially exposed from the through hole.

14 Claims, 4 Drawing Sheets

CYLINDER

BACKGROUND

1. Technical Field

The present disclosure relates to cylinders, and particularly to a cylinder for positioning a workpiece.

2. Description of Related Art

A cylinder may be used to push a workpiece, for positioning the workpiece. Many cylinders include a cylinder body defining a receiving chamber, a piston and a push rod received in the receiving chamber. The cylinder body may define two openings at opposite ends communicating with the receiving chamber. The piston may be movably received in the receiving chamber, a first end of the push rod may be fixed to the piston, and a second end of the push rod may extend out of the cylinder body via one opening. The push rod may be used to push a workpiece, for positioning the workpiece. However, the workpiece is just pushed by the push rod along a longitudinal direction of the push rod, which results in the workpiece being not able to be positioned in other directions. Thus the workpiece can slide along other directions, which results in an imprecise positioning of the workpiece and possible damage to the workpiece.

Therefore, there is room for improvement in the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
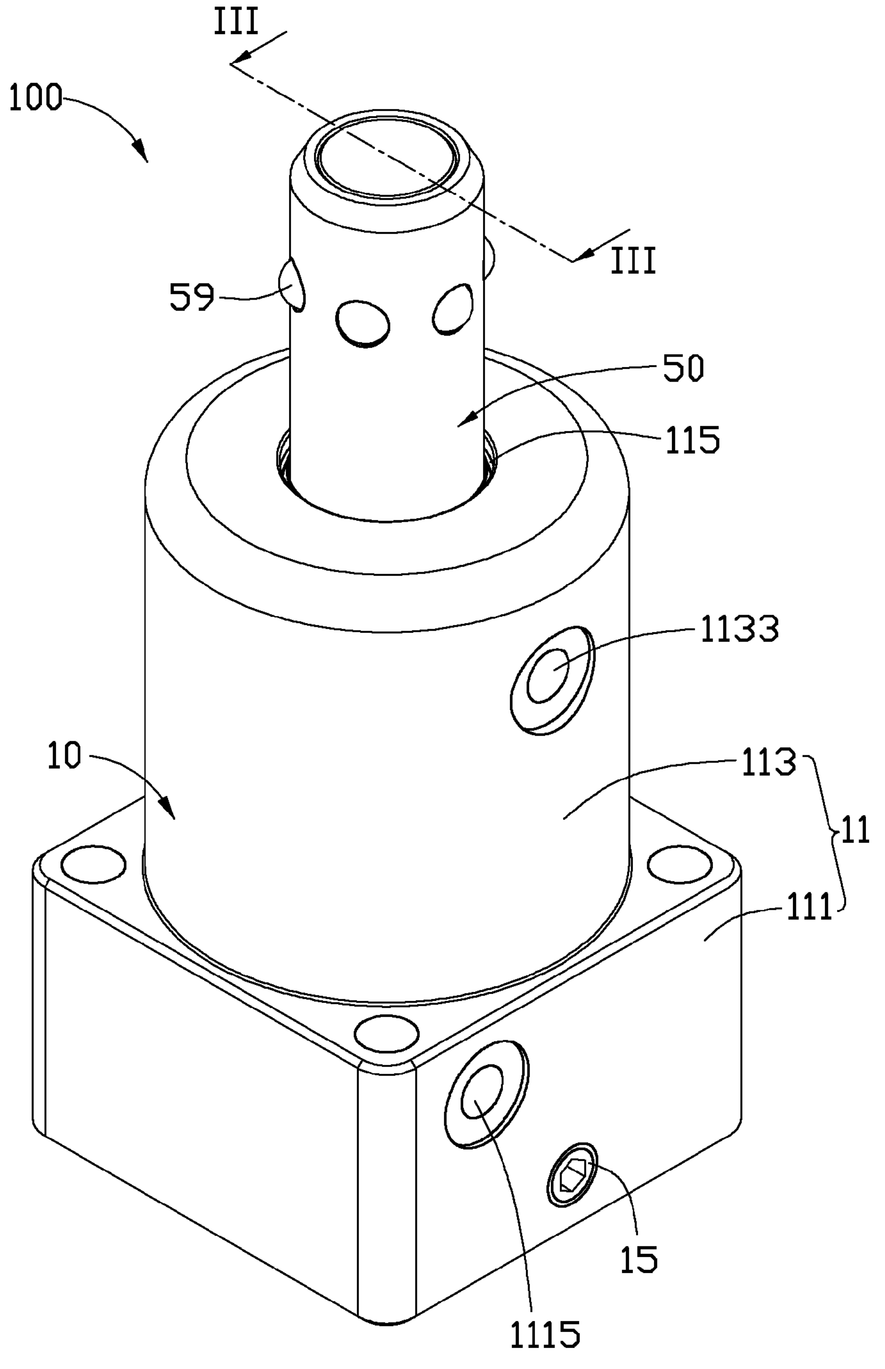
FIG. 1 is an isometric view of an embodiment of a cylinder.
Figure 2:
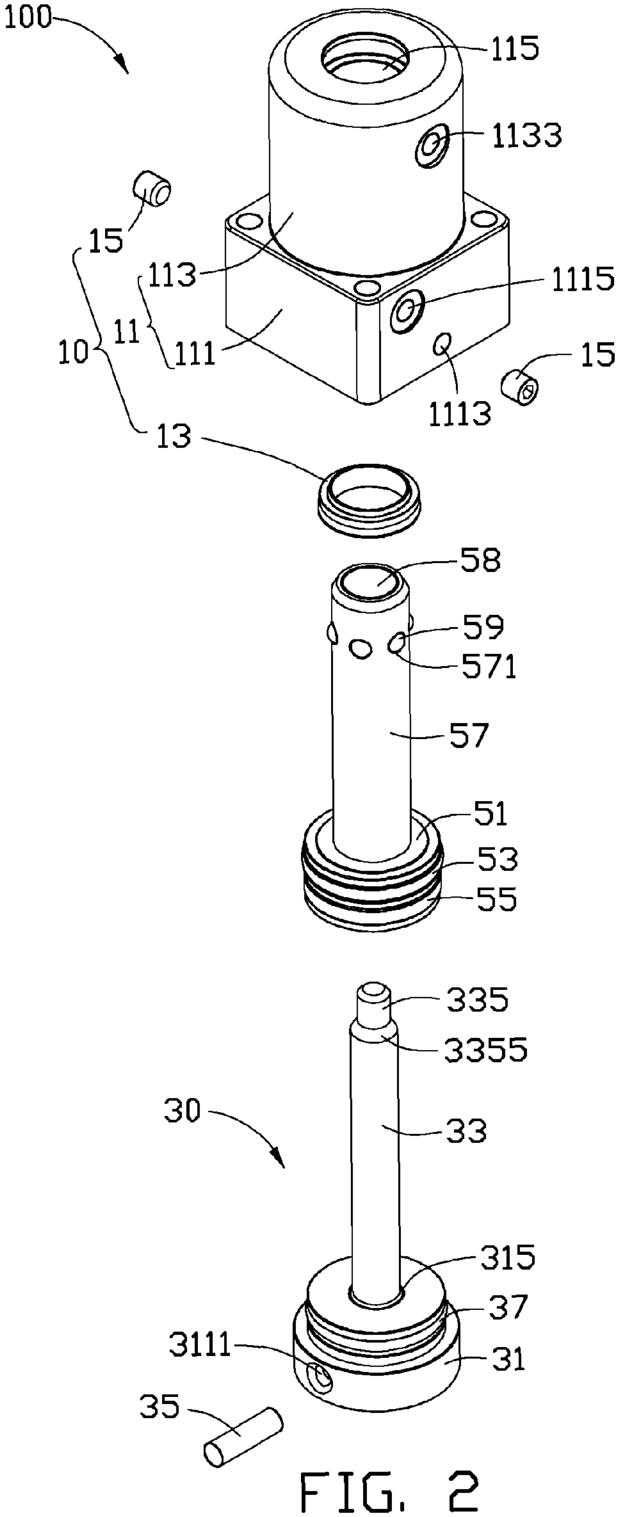
FIG. 2 is an exploded, isometric view of the cylinder shown in FIG. 1.

FIGS. 1 and 2 show an embodiment of a cylinder 100. The cylinder 100 includes a cylinder body assembly 10, a cylinder rod assembly 30, and a piston assembly 50. The cylinder rod assembly 30 is received in the cylinder body assembly 10. The piston assembly 50 is slidably sleeved on the cylinder rod assembly 30, and is slidably received in the cylinder body assembly 10.

Figure 3:
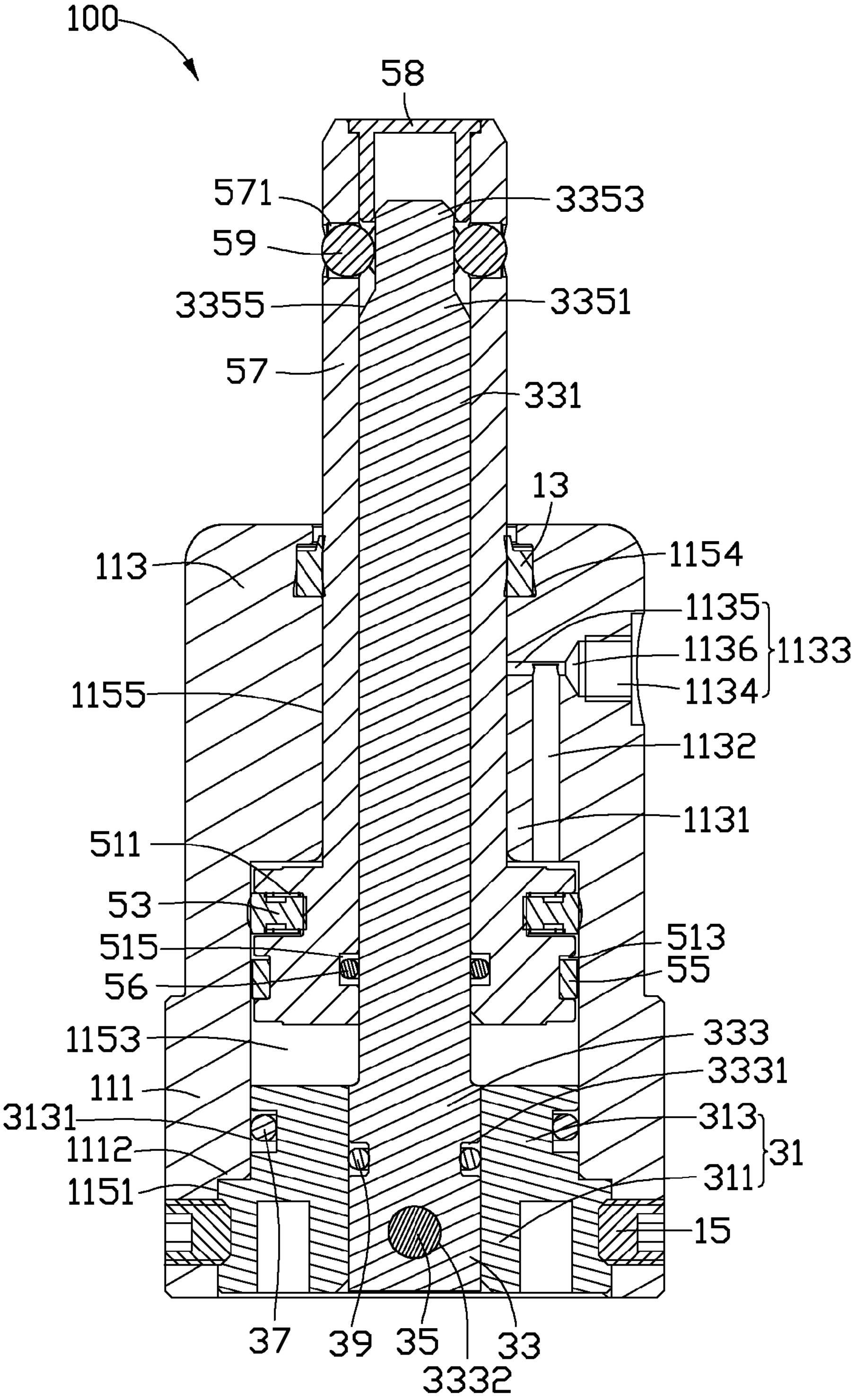
FIG. 3 is a cross-sectional view of the cylinder of FIG. 1, taken along line
Figure 4:
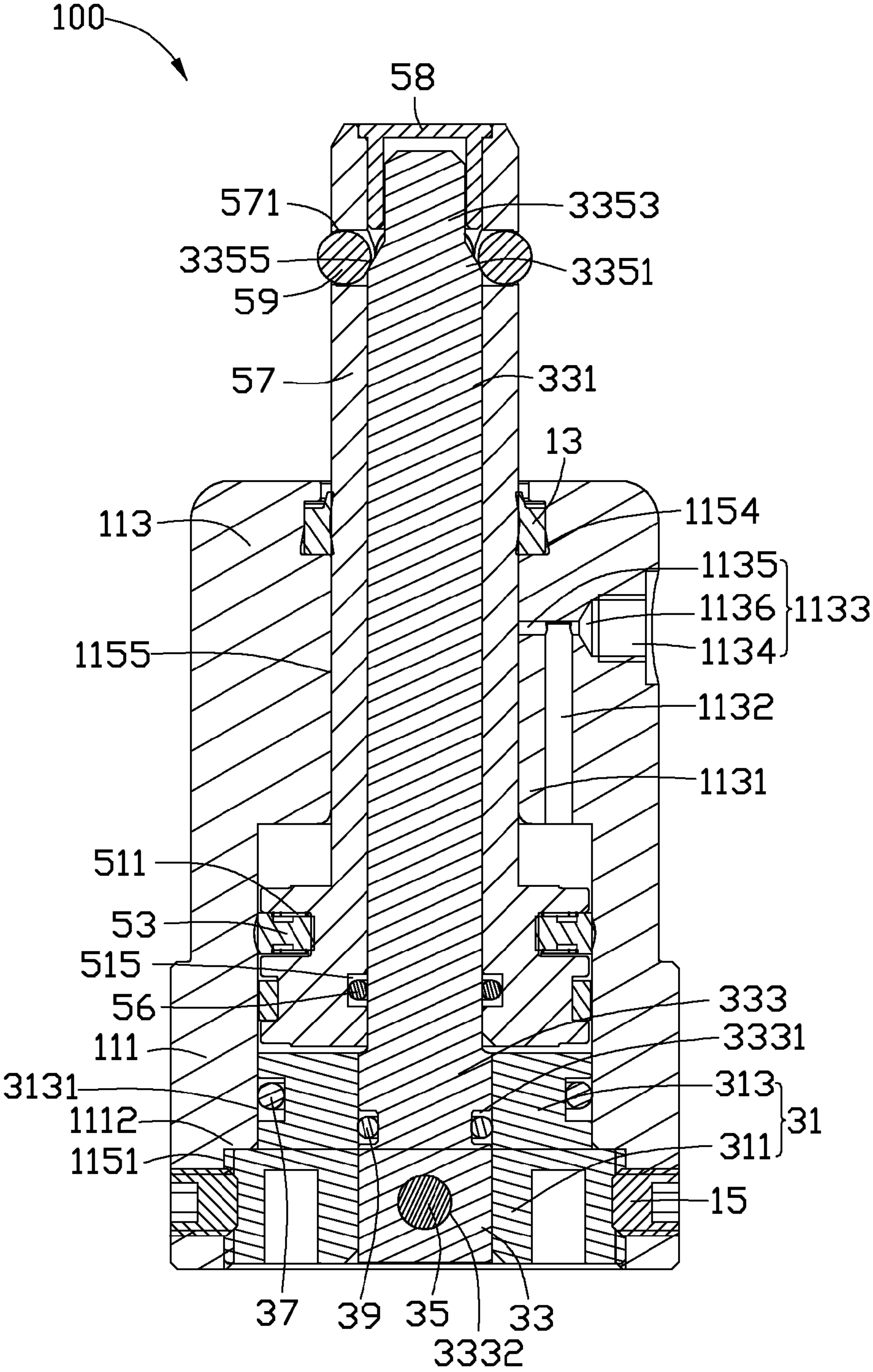
FIG. 4 is similar to FIG. 3, but show a working state of the cylinder.

FIGS. 3 and 4 show the cylinder body assembly 10 including a cylinder body 11, a sealing member 13, and two fasteners 15. The cylinder body 11 includes a mounting portion 111 and a receiving portion 113 perpendicularly extending out from a distal end of the mounting portion 111. The cylinder body 11 defines a receiving chamber 115 passing through the mounting portion 111 and the receiving portion 113. The mounting portion 111 forms a first shoulder portion 1112 at an inner sidewall thereof. The receiving portion 113 forms a second shoulder portion 1131 at an inner sidewall thereof. The first shoulder portion 1112 and the second shoulder portion 1131 cooperatively separate the receiving chamber 115 into a first chamber 1151, a second chamber 1153 and a third chamber 1155 communicating one by one, and define the receiving chamber 115 as step-shaped. The first chamber 1151 is located at a distal end of the mounting portion 111 away from the receiving portion 113. The second chamber 1153 is located at a connecting portion of the mounting portion 111 and the receiving portion 113. The third chamber 1155 is located at a distal end of the receiving portion 113 away from the mounting portion 111. An inner sidewall of the third chamber 1155 defines an annular groove 1154 at an end thereof away from the second chamber 1153, for receiving the sealing member 13.

The mounting portion 111 is substantially cubic. The first shoulder portion 1112 is substantially an annular protrusion perpendicularly protruding from the inner sidewall of the mounting portion 111. The mounting portion 111 further defines a pair of fixing holes 1113 at two opposite sidewalls, and a first air inlet hole 1115 at one of the sidewalls thereof. The fixing holes 1113 are circular through holes, and communicate with the first chamber 1151. The first air inlet hole 1115 is a through hole, and communicates with the second chamber 1153. In the illustrated embodiment, the first air inlet hole 1115 and one of the fixing holes 1113 are located at a same sidewall of the mounting portion 111.

The receiving portion 113 is substantially cylindrical. The second shoulder portion 1131 is substantially an annular protrusion perpendicularly protruding from the inner sidewall of the receiving portion 113. The receiving portion 113 defines a second air inlet hole 1133 at a sidewall thereof. The second air inlet hole 1133 is a through hole, and communicates with the third chamber 1155. The second shoulder portion 1131 defines a through groove 1132 parallel to an axis of the receiving portion 113. The through groove 1132 is located below the second air inlet hole 1133, and communicates with the second air inlet hole 1133.

In the illustrated embodiment, a shape of the first air inlet hole 1115 is same as a shape of the second air inlet hole 1133. The second air inlet hole 1133 includes a first end portion 1134, a second end portion 1135, and a connecting portion 1136 interconnecting the first end portion 1134 and the second end portion 1135. The first end portion 1134 is located at a distal end of the second air inlet hole 1133 away from the receiving chamber 115. The second end portion 1135 is located at a distal end of the second air inlet hole 1133 adjacent to the receiving chamber 115. A diameter of the first end portion 1134 is larger than a diameter of the second end portion 1135. The connecting portion 1136 is substantially conic. The shape of the first air inlet hole 1115 and the second air inlet hole 1133 is designed to increase the air pressure when air is flowing in.

The sealing member 13 is substantially annular, and a size of the sealing member 13 matches with a size of the annular groove 1154. The sealing member 13 is made of flexible materials, and is received in the annular groove 1154, for sealing the cylinder body 11. In the illustrated embodiment, the sealing member 13 is made of silicon. The fasteners 15 pass through the corresponding fixing holes 1113, and resist the cylinder rod assembly 30 received in the receiving chamber 115, for stopping the cylinder rod assembly 30 from rotating in the receiving chamber 115. In the illustrated embodiment, the fasteners 15 are jackscrews.

The cylinder rod assembly 30 includes a mounting base 31, a rod 33, and a connecting rod 35, a first sealing member 37, and a second sealing member 39. The mounting base 31 defines a through hole 315, for mounting the rod 33. The mounting base 31 is substantially shaped like two overlapped cylinders, and is received in the receiving chamber 115. The mounting base 31 includes a main body 311 and an extending portion 313 perpendicularly extending from the main body 311 towards the receiving portion 113. The main body 311 and the extending portion 313 are substantially annular, and a diameter of the extending portion 313 is smaller than a diameter of the main body 311. The main body 311 is received in the first chamber 1151, and defines a first through hole 3111 along a radial direction thereof. The extending portion 313 is received in an end of the second chamber 1153 adjacent to the first chamber 1151, and defines an annular first sealing groove 3131 at an outer sidewall thereof. The first sealing member 37 is received in the first sealing groove 3131.

The rod 33 includes a rod body 331, a fixing end 333 and a pushing end 335, in which the fixing end 333 and the pushing end 335 are located at two opposite ends of the rod body 331. A diameter of the rod body 331 is smaller than a diameter of the fixing end 333, and is greater than a diameter of the pushing end 335. The fixing end 333 is mounted and received in the through hole 315. The rod body 331 and the pushing end 335 are received in the receiving chamber 115. The fixing end 333 defines an annular second sealing groove 3331 at an outer sidewall thereof, and defines a second through hole 3332 corresponding to the first through hole 3111 of the main body 311. The second sealing member 39 is received in the second sealing groove 3331. The second through hole 3332 is aligned with the first through hole 3111, and communicates with the first through hole 3111. The connecting rod 35 passes through the first through hole 3111 and the second through hole 3332, for fixing the rod 33 with the mounting base 31. The pushing end 335 includes a first section 3351 and a second section 3353. The first section 3351 interconnects with the rod body 331 and the second section 3353. The second section 3353 is located at a distal end of the first section 3351 away from the rod body 331. The first section 3351 is substantially a frustum of a cone, and a diameter of a distal end thereof adjacent to the rod body 331 is greater than a diameter of a distal end thereof adjacent to the second section 3353. The first section 3351 includes a resisting surface 3355 at an outer sidewall thereof. The resisting surface 3355 is an inclined surface, and inclines from the distal end thereof adjacent to the rod body 331 to the other distal end adjacent to the second section 3353 towards an axis of the rod body 331. The second section 3353 is substantially cylindrical, and protrudes from the distal end of the first section 3351, outwardly.

The piston assembly 50 is sleeved on the rod body 331 and the pushing end 335, and includes a piston 51, a first sealing ring 53, a wear ring 55, a second sealing ring 56, a piston rod 57, a dust cover 58, and six resisting members 59. The piston 51 is substantially cylindrical, and is sleeved on the rod body 331 and is received in the second chamber 1153 besides the extending portion 313. An outer sidewall of the piston 51 resists against the inner sidewall of the second chamber 1153. The piston 51 defines a third sealing groove 511 and a containing groove 513 at an outer sidewall, and defines a fourth sealing groove 515 at an inner sidewall thereof. The third sealing groove 511, the containing groove 513, and the fourth sealing groove 515 are substantially annular. The first sealing ring 53 is received in the third sealing groove 511. The wear ring 55 is received in the containing groove 513. The second sealing ring 56 is received in the fourth sealing groove 515. The first sealing ring 53 and the second sealing ring 56 are made of flexible materials. The wear ring 55 is made of wearable materials.

The piston rod 57 is substantially cylindrical, and protrudes from a distal end of the piston 51 away from the extending portion 313, outwardly. An end portion of the piston rod 57 adjacent to the piston 51 is received in the second chamber 1153, and a middle portion of the piston rod 57 is received in the third chamber 1155, and another end portion of the piston rod 57 away from the piston 51 extends out from the receiving portion 113. An outer sidewall of the piston rod 57 resists against an inner sidewall of the third chamber 1155. The piston rod 57 defines six through holes 571 at the end away from the piston 51 along a circumference of the piston rod 57. The through holes 571 are adjacent to the resisting surface 3355. The sealing member 13 is received in the annular groove 1154, and is sleeved on the piston rod 57. The dust cover 58 is substantially cap-shaped, and is mounted on a distal end of the piston rod 57, for prevent dust from entering or dropping into the piston rod 57. The resisting members 59 are bearing balls, and are positioned between the corresponding through holes 571 and the pushing end 335. A diameter of the resisting member 59 is greater than a diameter of the through hole 571, thus the resisting members 59 can not be pushed out from the through holes 571. In other embodiments, the number of the through hole 571 and the resisting member 59 can be one or more than one. In other embodiments, the resisting members 59 can be in other shapes, such as ellipsoidal.

In assembly, the second sealing member 39 is received in the second sealing groove 3331. The fixing end 333 of the rod 33 is mounted in the mounting base 31. The connecting rod 35 fixes the rod 33 and the mounting base 31. The first sealing member 37 is received in the first sealing groove 3131. Therefore, the sub-assemblies of the cylinder rod assembly 30 are assembled together. Then, the resisting members 59 are mounted in the corresponding through holes 571. The dust cover 58 is detachably mounted on the piston rod 57. The first sealing ring 53, the wear ring 55, and the second sealing ring 56 are respectively mounted into the third sealing groove 511, the containing groove 513, and the fourth sealing groove 515. Therefore, the sub-assemblies of the piston assembly 50 are assembled together. Next, the piston assembly 50 is sleeved on the rod body 331. Finally, the sealing member 13 is received in the annular groove 1154, and the piston assembly 50 and the cylinder rod assembly 30 are inserted into the cylinder body 11. The fasteners 15 fasten the cylinder rod assembly 30 with the cylinder body 11.

In use, a workpiece (not shown) needed to be positioned is sleeved on the piston rod 57, and covers the through holes 571. Air is inputted into the second chamber 1153 of the receiving chamber 115 from the second air inlet hole 1133 and the through groove 1132. The piston 51 is forced to slide along the inner sidewall of the second chamber 1153 towards the mounting base 31. The air between the receiving portion 113 and the piston 51 flows out from the first air inlet hole 1115. The piston rod 57 slides along the inner sidewall of the third chamber 1155 towards the mounting base 31. The resisting surface 3355 resists the resisting members 59, and enable the resisting members 59 to be partially exposed from the through holes 571, thus the resisting members 59 resists and positions the workpiece as shown in FIG. 4. When the workpiece needs to be released from the cylinder 100, air is inputted into the second chamber 1153 from the first air inlet hole 1115. The piston 51 and the piston rod 57 slide away from the mounting base 31. The resisting surface 3355 releases and move away from the resisting members 59, and the resisting members 59 releases the workpiece.

Finally, while various embodiments have been described and illustrated, the disclosure is not to be construed as being restricted thereto. Various modifications can be made to the embodiments by those skilled in the art without departing from the true spirit and scope of the disclosure as defined by the appended claims.

What is claimed is:

1. A cylinder, comprising:

a cylinder body assembly comprising a cylinder body defining a receiving chamber;

a cylinder rod assembly comprising a mounting base, a rod, and a connecting rod, the mounting base being received in the receiving chamber and defining a through hole, the rod being inserted in the mounting base through the through hole and being fixed with the mounting base by the connecting rod; the rod comprising an inclined resisting surface; and a piston assembly comprising:

a piston slidably received in the receiving chamber and sleeved on the rod;

a piston rod protruding from the piston and extending out from the receiving chamber, the piston rod sleeved on the rod, and defining at least one through hole; and at least one resisting member movably mounted in the at least one through hole, wherein the rod comprises a rod body and a pushing end at a distal end of the rod body away from the piston, the pushing end comprises a first section and a second section, the first section interconnects the rod body with the second section, the first section is a frustum of a cone, the inclined resisting surface is at an outer sidewall of the first section, the second section is substantially cylindrical, and protrudes outwardly from a distal end of the first section; the piston and the piston rod slide relative to the rod, which enable the inclined resisting surface of the rod to resist the at least one resisting member to be partially exposed from the at least one through hole of the piston rod; and wherein the piston rod is substantially hollow cylindrical, and the piston assembly further comprises a dust cover, and the dust cover is detachably mounted on the piston rod to cover an end of the piston rod away from the piston.

2. The cylinder of claim 1, wherein the cylinder body comprises a mounting portion and a receiving portion protruding from the mounting portion, the receiving chamber passes through the mounting portion and the receiving portion, the mounting portion forms a first shoulder portion protruding from an inner sidewall thereof, the receiving portion forms a second shoulder portion protruding from an inner sidewall thereof, the first shoulder portion and the second shoulder portion separate the receiving chamber into a first chamber, a second chamber, and a third chamber, cooperatively, the piston is received in the second chamber, a part of the piston rod adjacent to the piston is received in the second chamber, and a middle portion of the piston rod is received in the third chamber.

3. The cylinder of claim 2, wherein the mounting base is received in the first chamber and the second chamber, the mounting base is fixed with the mounting portion, and the mounting base resists the first shoulder portion.

4. The cylinder of claim 2, wherein the piston is received in the second chamber, and an outer sidewall of the piston resists against an inner sidewall of the second chamber.

5. The cylinder of claim 2, wherein the mounting portion defines a first air inlet hole, the receiving portion defines a second air inlet hole, the first air inlet hole communicates with the second chamber, the second air inlet hole communicates with the third chamber, the second chamber defines a through groove communicating with the second air inlet hole and the second chamber, the first air inlet hole and the through groove are positioned at opposite sides of the piston.

6. The cylinder of claim 5, wherein a diameter of an end of the first air inlet hole away from the receiving chamber is greater than a diameter of an end thereof adjacent to the receiving chamber, a diameter of an end of the second air inlet hole away from the receiving chamber is greater than a diameter of an end thereof adjacent to the receiving chamber.

7. The cylinder of claim 1, wherein the at least one resisting member is a ball, and a diameter of the at least one resisting member is larger than a diameter of the at least one through hole.

8. A cylinder, comprising:

a cylinder body assembly comprising a cylinder body defining a receiving chamber;

a cylinder rod assembly comprising a mounting base, a rod, and a connecting rod, the mounting base being received in the receiving chamber and defining a through hole, the rod being inserted in the mounting base through the through hole and being fixed with the mounting base by the connecting rod; the rod comprising an inclined resisting surface; and a piston assembly comprising:

a piston slidably received in the receiving chamber and sleeved on the rod;

a piston rod protruding from the piston and extending out from the receiving chamber, the piston rod sleeved on the rod, and defining at least one through hole; and at least one resisting member movably mounted in the at least one through hole, wherein the rod comprises a rod body and a pushing end at a distal end of the rod body away from the piston, the pushing end comprises a first section and a second section, the first section interconnects the rod body with the second section, the first section is a frustum of a cone, the inclined resisting surface is at an outer sidewall of the first section, the second section is substantially cylindrical, and protrudes outwardly from a distal end of the first section; the piston and the piston rod slide relative to the rod, which enable the inclined resisting surface of the rod to resist the at least one resisting member to be partially exposed from the at least one through hole of the piston rod.

9. The cylinder of claim 8, wherein the cylinder body comprises a mounting portion and a receiving portion protruding from the mounting portion, the receiving chamber passes through the mounting portion and the receiving portion, the mounting portion forms a first shoulder portion protruding from an inner sidewall thereof, the receiving portion forms a second shoulder portion protruding from an inner sidewall thereof, the first shoulder portion and the second shoulder portion separate the receiving chamber into a first chamber, a second chamber, and a third chamber, cooperatively, the piston is received in the second chamber, a part of the piston rod adjacent to the piston is received in the second chamber, and a middle portion of the piston rod is received in the third chamber.

10. The cylinder of claim 9, wherein the mounting base is received in the first chamber and the second chamber, the mounting base is fixed with the mounting portion, and the mounting base resists the first shoulder portion.

11. The cylinder of claim 9, wherein the piston is received in the second chamber, and an outer sidewall of the piston resists against an inner sidewall of the second chamber.

12. The cylinder of claim 9, wherein the mounting portion defines a first air inlet hole, the receiving portion defines a second air inlet hole, the first air inlet hole communicates with the second chamber, the second air inlet hole communicates with the third chamber, the second chamber defines a through groove communicating with the second air inlet hole and the second chamber, the first air inlet hole and the through groove are positioned at opposite sides of the piston.

13. The cylinder of claim 12, wherein a diameter of an end of the first air inlet hole away from the receiving chamber is greater than a diameter of an end thereof adjacent to the receiving chamber, a diameter of an end of the second air inlet hole away from the receiving chamber is greater than a diameter of an end thereof adjacent to the receiving chamber.

14. The cylinder of claim 8, wherein the at least one resisting member is a ball, and a diameter of the at least one resisting member is larger than a diameter of the at least one through hole.

* * * * *